(12) United States Patent
Wu et al.

(10) Patent No.: US 8,652,627 B2
(45) Date of Patent: *Feb. 18, 2014

(54) INTERMEDIATE TRANSFER MEMBER

(75) Inventors: Jin Wu, Pittsford, NY (US); David W. Martin, Walworth, NY (US); Lanhui Zhang, Webster, NY (US); Lin Ma, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 480 days.

This patent is subject to a terminal disclaimer.

(21) Appl. No.: 13/052,221

(22) Filed: Mar. 21, 2011

(65) Prior Publication Data

US 2012/0244463 A1   Sep. 27, 2012

(51) Int. Cl.
*G03G 5/04* (2006.01)
*B32B 27/00* (2006.01)

(52) U.S. Cl.
USPC .......... 428/220; 426/323; 426/327; 426/447; 426/451; 426/473.5

(58) Field of Classification Search
USPC .............. 428/220, 447, 451, 473.5, 323, 327
See application file for complete search history.

(56) References Cited

U.S. PATENT DOCUMENTS 8,153,213 B2 *   4/2012   Wu ............................ 428/32.51

* cited by examiner

*Primary Examiner* — D. S. Nakarani
(74) *Attorney, Agent, or Firm* — Hoffman Warnick LLC

(57) ABSTRACT

There is disclosed an intermediate transfer member that includes a layer of a polymer blend of polyimide and amino silicone having conductive particles dispersed therein.

20 Claims, 2 Drawing Sheets

INTERMEDIATE TRANSFER MEMBER

BACKGROUND

1. Field of Use

This disclosure is directed to an image-forming apparatus and an intermediate transfer member.

2. Background

Image-forming apparatuses in which a color or black and white image is formed by using an intermediate transfer member to electrostatically transfer toner are well known. When an image is formed on a sheet of paper in a color image-forming apparatus using such an intermediate transfer member, four color images in yellow, magenta, cyan and black respectively are generally first transferred sequentially from an image carrier such as a photoreceptor and superimposed on the intermediate transfer member (the primary transfer). This full color image is then transferred to a sheet of paper in a single step (the secondary transfer). In a black and white image-forming apparatus, a black image is transferred from the photoreceptor, superimposed on an intermediate transfer member, and then transferred to a sheet of paper.

An intermediate transfer member is required in an image-forming apparatus. For low end electrophotographic machines, thermoplastic intermediate transfer members are used due to their low cost; however, the modulus of thermoplastic materials is relatively low from about 1,000 to 2,000 MPa. Materials such as polycarbonate, polyester and polyamide are used for such machines.

For high end electrophotographic machines, thermoplastic or thermoset polyimides or polyamideimides are widely used due to their high modulus (over 3,500 MPa); however, intermediate transfer members using these materials are more expensive to make. Both the raw material cost and manufacturing process cost are higher using thermoplastic or thermoset polyimides or polyamideimides. One issue is that the materials used in higher cost machines do not easily release from metal substrates. An intermediate transfer belt possessing high modulus and excellent release for high end machines is desired.

SUMMARY

According to various embodiments there is disclosed an intermediate transfer member comprising a layer comprising a polymer blend of polyimide and amino silicone, where the amino silicone is represented by structures selected from the group consisting of:

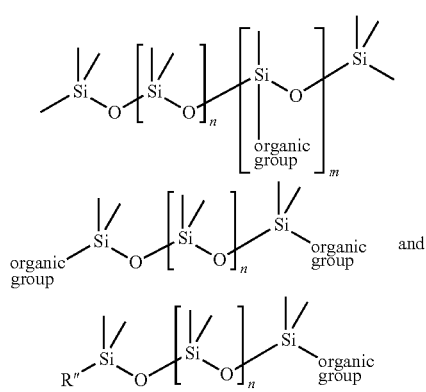

wherein the organic group is one of —RNH$_2$ or —RNHR'NH$_2$; R, R' and R" each represent an alkyl having from about 1 to about 8 carbon atoms; n is from about 1 to about 100 and m is from about 1 to about 100.

According to various embodiments there is provided an intermediate transfer member that includes a layer comprising a polymer blend of polyimide and amino silicone having carbon black dispersed therein.

According to various embodiments, disclosed herein is an intermediate transfer member that includes a layer comprising a polymer blend of polyimide and amino silicone having conductive particles dispersed therein.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
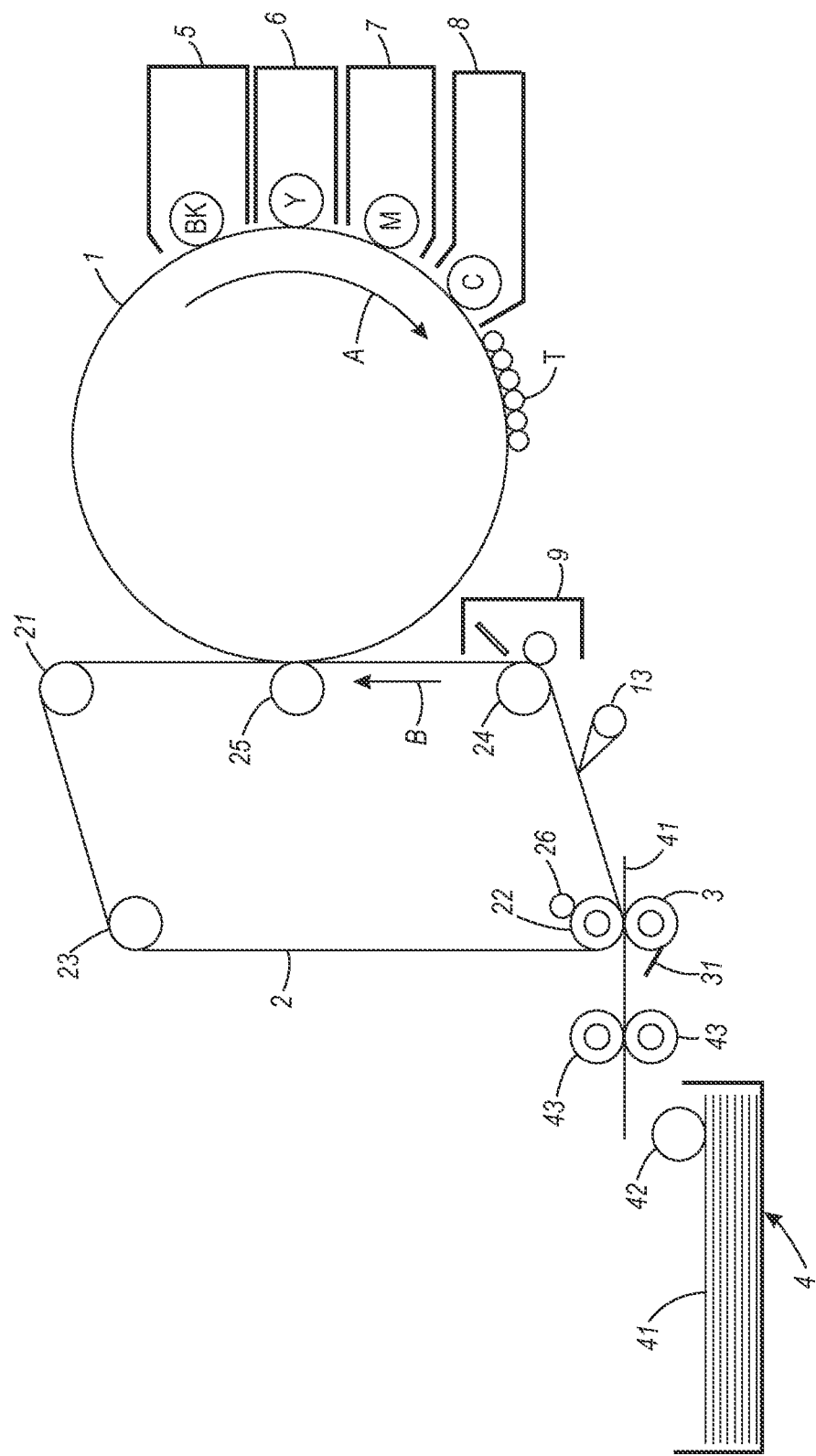
FIG. 1 is a schematic illustration of an image apparatus.

Referring to FIG. 1, an image-forming apparatus includes an intermediate transfer member as described in more detail below. The image-forming apparatus is an image-forming apparatus of an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also in the image-forming apparatus, the intermediate transfer member may be provided as a transfer-conveying member for conveying the transfer material in the transfer region for transferring the toner image onto the transfer material. Having the intermediate transfer member that transfers images of high quality and that remains stable for a long period is required.

The image-forming apparatus described herein is not particularly limited as far as it is an image-forming apparatus of intermediate transfer type, and examples include an ordinary monochromatic image-forming apparatus accommodating only a monochromatic color in the developing device, a color image-forming apparatus for repeating primary transfer of the toner image carried on the image carrier sequentially on the intermediate transfer member, and a tandem color image-forming apparatus having plural image carriers with developing units of each color disposed in series on the intermediate transfer member. More specifically, it may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and others by known methods as required.

As the image carrier, a known one may be used. As its photosensitive layer, an organic system, amorphous silicon, or other known material may be used. In the case of the image carrier of cylindrical type, it is obtained by a known method of molding aluminum or aluminum alloy by extrusion, and processing the surface. A belt form image carrier may also used.

The charging unit is not particularly limited, and known chargers may be used, such as a contact type charger using a conductive or semiconductive roller, brush, film and rubber blade, scorotron charger or corotron charge making use of corona discharge, and others. Above all, the contact type charging unit is preferred from the viewpoint of excellent, charge compensation capability. The charging unit usually applies DC current to the electrophotographic photosensitive material, but AC current may be further superposed.

The exposure unit is not particularly limited, and, for example, an optical system device may be used, which exposes a desired image on the surface of the electrophotographic photosensitive material by using a light source such as semiconductor laser beam, LED beam, liquid crystal shutter beam or the like, or through a polygonal mirror from such light source.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using a member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used together.

The second transfer unit may be same as the first transfer unit such as a contact type transfer charger using a transfer roller and others, scorotron transfer charger and corotron transfer charger. By pressing firmly by the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be done.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as a heat roller fixing unit and an oven fixing unit.

The cleaning unit is not particularly limited, and any known cleaning device may be used.

A color image-forming apparatus for repeating primary transfer is shown schematically in FIG. 1. The image-forming apparatus shown in FIG. 1 includes a photosensitive drum 1 as an image carrier, a transfer member 2 as an intermediate transfer member such as a transfer belt, a bias roller 3 as a transfer electrode, a tray 4 for feeding paper as transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and a feed roller 43.

In the image-forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the transfer member 2, and the primary transfer is executed by rotation of the transfer member 2 in the direction of arrow B.

Similarly, a toner image of a second color, a toner image of a third color and a toner image of a fourth color are sequentially formed, and overlaid on the transfer member 2, and a multi-layer toner image is formed.

The multi-layer toner image transferred on the transfer member 2 is brought to the secondary transfer unit comprising the bias roller 3 by rotation of the transfer member 2. The secondary transfer unit comprises the bias roller 3 disposed at the surface side carrying the toner image of the transfer member 2, backup roller 22 disposed to face the bias roller 3 from the back side of the transfer member 2, and electrode roller 26 rotating in tight contact with backup roller 22.

The paper 41 is taken out one by one from the paper block accommodated in the paper tray 4 by means of the pickup roller 42, and is fed into the space between the transfer member 2 and bias roller 3 of the secondary transfer unit by means of the feed roller 43 at a specified timing. The fed paper 41 is conveyed under pressure between the bias roller 3 and backup roller 22, and the toner image carried on the transfer belt 2 is transferred thereon by rotation of the transfer member 2.

The paper 41 on which the toner image is transferred is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31 made of polyurethane or the like may be always in contact, and toner particles, paper dust and other foreign matter sticking by transfer are removed.

In the case of transfer of a monochromatic image, the toner image T after primary transfer is immediately sent to the secondary transfer process, and is conveyed to the fixing device, but in the case of transfer of a multi-color image by combination of plural colors, the rotation of the transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a belt including an endless belt, an endless seamed flexible belt, an endless seamless flexible belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the paper can be by any suitable technique conventionally used in electrophotography, such as corona transfer, pressure transfer, bias transfer, and combinations of those transfer means, and the like.

The intermediate transfer member can be of any suitable configuration. Examples of suitable configurations include a sheet, a film, a web, a foil, a strip, a coil, a cylinder, a drum, an endless strip, a circular disc, a drelt (a cross between a drum and a belt), a belt including an endless belt, an endless seamed flexible belt, and an endless seamed flexible imaging belt.

Figure 2:
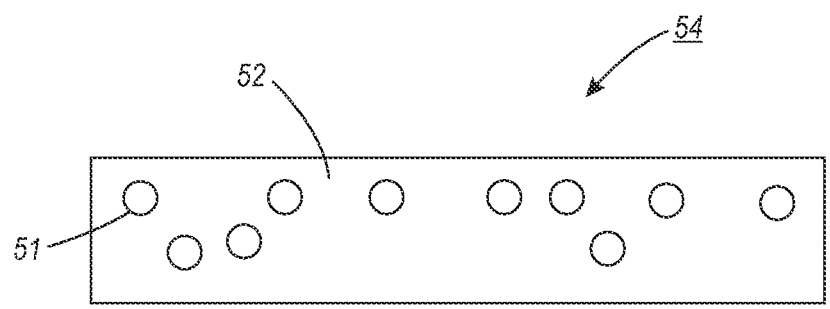
FIG. 2 is a schematic representation of an embodiment disclosed herein.

In an embodiment shown in FIG. 2, the intermediate transfer member 54 is in the form of a film in a one layer configuration. The intermediate transfer member 54 includes a polymer blend 52 of polyimide and an amino silicone, and in embodiments, has conductive particles 51 dispersed therein. The conductive particles 51 are optional and used to control the conductivity.

The intermediate transfer member possesses a modulus of from about 3000 MPa to about 8000 MPa, or from about from about 3500 MPa to about 6500 MPa, from about 4000 MPa to about 5500 MPa.

The intermediate transfer member possesses a water contact angle of from about 80° to about 140°, or from about 90° to about 130°, or from about 100° to about 120°

The thermoset polyimide and amino silicone ITB composition described herein self releases from a metal substrate such as stainless steel. Typical processes require the application of an external release layer on the metal substrate before coating the polyimide ITB layer, and then releasing it. The composition of themoset polyimide and amino silicone is cost effective since only one coating layer is needed.

The thermoset polyimide ITB comprises a polyamic acid such as a polyamic acid of pyromellitic dianhydride/4,4-oxydianiline, a conductive agent such as carbon black and an internal release agent such as an amino silicone with a concentration of from about 0.1 weight percent to about 5.0 weight percent, or from about 0.2 weight percent to about 2.0 weight percent, or from about 0.4 weight percent to about 1.0 weight percent of the total solids of the composition. The amino silicone can chemically interact with the polyamic acid and is incorporated into the polyimide network.

The disclosed polyamic acid includes one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like and mixtures thereof.

Commercial examples of polyamic acid of pyromellitic dianhydride/4,4-oxydianiline include PYRE-ML RC5019 (about 15-16 weight percent in N-methyl-2-pyrrolidone, NMP), RC5057 (about 14.5-15.5 weight percent in NMP/aromatic hydrocarbon=80/20), and RC5083 (about 18-19 weight percent in NMP/DMAc=15/85), all from Industrial Summit technology Corp., Parlin, N.J.; DURIMIDE® 100, commercially available from FUJIFILM Electronic Materials U.S.A., Inc.

Commercial examples of polyamic acid of biphenyl tetracarboxylic dianhydride/4,4'-oxydianiline include U-VARNISH A, and S (about 20 weight in NMP), both from UBE America Inc., New York, N.Y.

Commercial examples of polyamic acid of biphenyl tetracarboxylic dianhydride/phenylenediamine include PI-2610 (about 10.5 weight in NMP), and PI-2611 (about 13.5 weight in NMP), both from HD MicroSystems, Parlin, N.J.

Commercial examples of polyamic acid of benzophenone tetracarboxylic dianhydride/4,4'-oxydianiline include RP46, and RP50 (about 18 weight percent in NMP), both from Unitech Corp., Hampton, Va.

Commercial examples of polyamic acid of benzophenone tetracarboxylic dianhydride/4,4'-oxydianiline/phenylenediamine include PI-2525 (about 25 weight percent in NMP), PI-2574 (about 25 weight percent in NMP), PI-2555 (about 19 weight percent in NMP/aromatic hydrocarbon=80/20), and PI-2556 (about 15 weight percent in NMP/aromatic hydrocarbon/propylene glycol methyl ether=70/15/15), all from HD MicroSystems, Parlin, N.J.

Various amounts of polyamic acid can be selected for the polymer blend, such as for example, from about 95 to about 99.9 weight percent, from about 98 to about 99.8 weight percent, or from about 99 to about 99.5 weight percent.

Other polyamic acid or ester of polyamic acid examples that can be included in the intermediate transfer member are from the reaction of a dianhydride and a diamine. Suitable dianhydrides include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy)phenyl) hexafluoropropane dianhydride, 4,4'-bis(3,4-dicarboxy-2,5, 6-trifluorophenoxy)octafluorobiphenyl dianhydride, 3,3',4, 4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl)sulfide dianhydride, di-(3,4- dicarboxyphenyl)methane dianhydride, di-(3,4-dicarboxyphenyl)ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 4,4'-diphenylsulfidedioxybis(4-phthalic acid)dianhydride, 4,4'-diphenylsulfonedioxybis(4-phthalic acid)dianhydride, methylenebis(4-phenyleneoxy-4-phthalic acid)dianhydride, ethylidenebis(4-phenyleneoxy-4-phthalic acid)dianhydride, isopropylidenebis-(4-phenyleneoxy-4-phthalic acid)dianhydride, hexafluoroisopropylidenebis(4-phenyleneoxy-4-phthalic acid)dianhydride, and the like. Exemplary diamines suitable for use in the preparation of the polyamic acid include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, 4,4'-diamino-2,2',3,3',5,5',6,6'-octafluorodiphenyl ether, bis[4-(3-aminophenoxy)-phenyl]sulfide, bis[4-(3-aminophenoxy)phenyl]sulfone, bis[4-(3-aminophenoxy)phenyl]ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane, and the like and mixtures thereof.

The dianhydrides and diamines are, for example, selected in a weight ratio of dianhydride to diamine of from about 20:80 to about 80:20, and more specifically, in an about 50:50 weight ratio. The above aromatic dianhydride like aromatic tetracarboxylic acid dianhydrides and diamines like aromatic diamines are used singly or as a mixture, respectively.

Silicone itself is widely used as releasing agent. However, when mixed with a polyamic acid, it is incompatible with the polyamic acid coating solution (phase separation), and the resulting polyimide shows clear phase separation and the releasing of the polyimide from the coating substrate varies and is very difficult to control. Using a functionalized silicone, such as an amino silicone, which is compatible with the coating solution (clear when mixed), and the resulting polyimide is also clear with no apparent phase separation. In addition, the amino silicone can chemically interact with the polyamic acid, thus be incorporated into the polyimide network. The resulting polyimide self releases from the metal coating substrate consistently.

The amino silicone can be a dual end type such as KF-8010 (functional group equivalent weight=430 g/mol), X-22-161B (functional group equivalent weight=1,500 g/mol), or KF-8012 (functional group equivalent weight=2,200 g/mol); or a side chain type including mono amino such as KF-864 (functional group equivalent weight=3,800 g/mol), diamino such as KF-393 (functional group equivalent weight=350 g/mol), or KF-861 (functional group equivalent weight=1,600 g/mol), and amino polyether such as X-22-3939A (functional group equivalent weight=1,700 g/mol), all available from Shin Etsu Chemical Co., Ltd., Tokyo, Japan.

Various amounts of amino silicone can be selected for the polymer blend, such as for example, from about 5.0 to about 0.1 weight percent, from about 2.0 to about 0.2 weight percent, or from about 1.0 to about 0.5 weight percent.

The amino silicone is represented by following structures

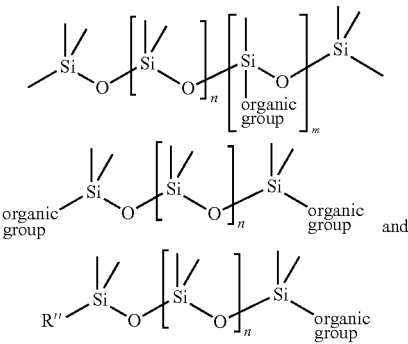

wherein the organic group is one of $-RNH_2$ or $-RNHR'NH_2$; R, R' and R" each represent an alkyl having from about 1 to about 8 carbon atoms; n is from about 1 to about 100 and m is from about 1 to about 100.

Certain electrically conductive particles 51 are dispersed in the polymer blend 52 of polyimide and amino silicone, and help to decrease the resistivity into the desired surface resistivity range of from about $10^8$ ohms/square to about $10^{13}$ ohms/square, or from about $10^{10}$ ohms/square to about $10^{12}$ ohms/square. The volume resistivity is from about $10^8$ ohm-cm to about $10^{12}$ ohm-cm, or from about $10^9$ ohm-cm to about $10^{11}$ ohm-cm. The resistivity can be provided by varying the concentration of the conductive particles 51.

Examples of conductive particles 51 include carbon blacks, carbon nanotubes, metal oxides, doped metal oxides, polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts, and mixtures thereof. The conductive filler may be present in an amount of from about 0.1 parts by weight to about 50 parts by weight, or from about 3 parts by weight to about 40 parts by weight, or from about 5 parts by weight to about 20 parts by weight of total solids of the intermediate transfer member.

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is primarily dependent on surface area and its structure; generally, the higher the surface area and the higher the structure, the more conductive the carbon black. Surface area is measured by the B.E.T. nitrogen surface area per unit weight of carbon black, and is the measurement of the primary particle size. The surface area of the carbon black described herein is from about 460 m$^2$/g to about 35 m$^2$/g. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the ITM include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area 343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); Channel carbon blacks available from Evonik-Degussa; Special Black 4 (B.E.T. surface area=180 m$^2$/g, DBP absorption=1.8 ml/g, primary particle diameter=25 nanometers), Special Black 5 (B.E.T. surface area=240 m$^2$/g, DBP absorption=1.41 ml/g, primary particle diameter=20 nanometers), Color Black FW1 (B.E.T. surface area=320 m$^2$/g, DBP absorption=2.89 ml/g, primary particle diameter=13 nanometers), Color Black FW2 (B.E.T. surface area=460 m$^2$/g, DBP absorption=4.82 ml/g, primary particle diameter=13 nanometers), and Color Black FW200 (B.E.T. surface area=460 m$^2$/g, DBP absorption=4.6 ml/g, primary particle diameter=13 nanometers).

Further examples of conductive fillers include doped metal oxides. Doped metal oxides include antimony doped tin oxide, aluminum doped zinc oxide, antimony doped titanium dioxide, similar doped metal oxides, and mixtures thereof.

Suitable antimony doped tin oxides include those antimony doped tin oxides coated on an inert core particle (e.g., ZELEC®ECP-S, M and T) and those antimony doped tin oxides without a core particle (e.g., ZELEC®ECP-3005-XC and ZELEC®ECP-3010-XC, ZELEC® is a trademark of DuPont Chemicals Jackson Laboratories, Deepwater, N.J.). The core particle may be mica, TiO$_2$ or acicular particles having a hollow or a solid core.

In another embodiment, the electrically conductive particles include antimony doped tin oxide coated on an inert core particle (e.g., ZELEC® ECP-S, M and T). ZELEC® is a trademark of DuPont Chemicals Jackson Laboratories, Deepwater, N.J. The core particle may be mica, TiO$_2$ or acicular particles having a hollow or a solid core.

In another embodiment, antimony doped tin oxide particles are prepared by densely layering a thin layer of antimony doped tin oxide onto the surface of a silica shell or silica-based particle, wherein the shell, in turn, has been deposited onto a core particle. The crystallites of the conductor are dispersed in such a fashion so as to form a dense conductive surface on the silica layer. This provides optimal conductivity. Also, the particles are fine enough in size to provide adequate transparency. The silica may either be a hollow shell or layered on the surface of an inert core, forming a solid structure. Forms of antimony doped tin oxide are commercially available under the tradename ZELEC® ECP (electro-conductive powders) from DuPont Chemicals Jackson Laboratories, Deepwater, N.J. Particularly preferred antimony doped tin oxides are ZELEC® ECP 1610-S, ZELEC® ECP 2610-S, ZELEC® ECP 3610-S, ZELEC® ECP 1703-S, ZELEC® ECP 2703-S, ZELEC® ECP 1410-M, ZELEC® ECP 3005-XC, ZELEC® ECP 3010-XC, ZELEC® ECP 1410-T, ZELEC® ECP 3410-T, ZELEC® ECP-S-X1, and the like. Three commercial grades of ZELEC® ECP powders are preferred and include an acicular, hollow shell product (ZELEC® ECP-S), an equiaxial titanium dioxide core product (ZELEC ECP-T), and a plate shaped mica core product (ZELEC® ECP-M).

The thickness of the intermediate transfer member as a single layer is from about 30 microns to about 400 microns, or from about 50 microns to about 200 microns, or from about 70 microns to about 150 microns.

A method of manufacturing the intermediate transfer member includes mixing conductive particles, polyamic acid and amino silicone form a dispersion. Examples of the solvent selected to form the dispersion include toluene, tetrahydrofuran, N,N'-dimethylformamide, N,N'-dimethylacetamide, N-methylpyrrolidone, methylene chloride and the like and mixtures thereof. The dispersion of monomers and conductive particles is coated and cured. The dispersion is coated on a substrate in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like.

The polyimide amino silicone layer is coated on a substrate, and pre-cured at a temperature between about 125° C. and about 190° C. for a time of about 30 to about 90 minutes. The pre-cured polyimide belt is then completely cured at about 250° C. to about 370° C. for a time of about 30 to about 90 minutes and self releases from the substrate. In an embodiment a stainless steel belt is used as the substrate. The substrate is rotated at a speed of from about 20 rpm to about 100 rpm during the thermal curing of the coating.

The final curing produces a belt that exhibits suitable properties for use as a intermediate transfer member.

Specific embodiments will now be described in detail. These examples are intended to be illustrative, and not limited to the materials, conditions, or process parameters set forth in these embodiments. All parts are percentages by solid weight unless otherwise indicated.

EXAMPLES

A coating dispersion comprising carbon black/polyamic acid of pyromellitic dianhydride/4,4-oxydianiline/amino silicone in a weight ratio of 14/85.5/0.5. was preaped by ball milling. The carbon black was special black 4 from Degussa; the polyamic acid was Pyre-M.L. RC5083 from Industrial Summit Technology; and the amino silicone was KF-8010 from Shin Etsu Chemical Co., Ltd., was prepared in DMAc/NMP=85/15, about 17 weight percent solids. The coating dispersion was coated on a stainless steel substrate, and subsequently cured at 125° C. for 30 minutes, 190° C. for 30 minutes and 320° C. for 60 minutes. The resulting polyimide ITB (Example 1) self released from the substrate.

As comparison, a polyimide ITB was prepared similarly as Example 1 except that there was no amino silicone incorporated. The resulting polyimide ITB (Comparative Example 1) did not release from the substrate. After immersing in water for months, it finally released from the substrate. Incorporation of the amino silicone into the ITB helped releasing the ITB from the substrate.

The polyimide ITB (Example 1) was about 80 µm thick and it was flat with a smooth surface and no any curl. Surface resistivity, Young's modulus and water contact angle were measured using the standard methods, and the results are shown in Table 1. As comparison, the data from the Comparative Example 1 polyimide ITB were also included in Table 1.

TABLE 1

| | Surface resistivity (ohm/sq) | Young's modulus (MPa) | ITB release from metal substrate | Water contact angle |
|---|---|---|---|---|
| Example 1 | 4.2 × 10$^{10}$ | 4,000 | Excellent | 104° |
| Comparative Example 1 (no amino silicone) | 3.6 × 10$^{10}$ | 3,900 | Needs immersing in water for months | 75° |

The polyimide amino silicone ITB also exhibited low surface energy, which is believed to be beneficial for toner cleaning and transfer. In addition, the polyimide amino silicone ITB provides a low cost option due to elimination of the extra release layer coating.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:
1. An intermediate transfer member comprising:
a layer comprising a polymer blend of polyimide and amino silicone, wherein the amino silicone is represented by structures selected from the group consisting of:

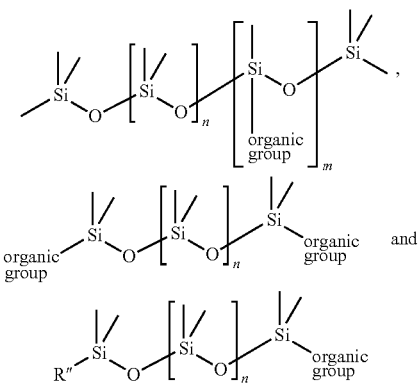

wherein the organic group is one of —RNH$_2$ or —RNHR'NH$_2$; R, R' and R" each represent an alkyl having from 1 to 8 carbon atoms; n is an integer from 1 to 100 and m is an integer from 1 to 100.

2. The intermediate transfer member of claim 1 wherein the layer further comprises a conductive component.

3. The intermediate transfer member of claim 2 wherein the conductive component is selected from the group consisting of carbon blacks, carbon nanotubes, metal oxides, doped metal oxides, polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts, and mixtures thereof.

4. The intermediate transfer member of claim 2 wherein the conductive component comprises from about 0.1 to about 50 weight percent of the layer.

5. The intermediate transfer member of claim 1 wherein the amino silicone comprises from about 0.1 to about 5.0 weight percent of the polymer blend.

6. The intermediate transfer member of claim 1 wherein the polyimide comprises from about 99.9 weight percent to about 95.0 weight percent of the polymer blend.

7. The intermediate transfer member of claim 1 wherein the layer comprises a water contact angle of from about 80° to about 140°.

8. The intermediate transfer member of claim 1 wherein the layer comprises modulus of from about 3000 MPa to about 8000 MPa.

9. An intermediate transfer member comprising:
a layer comprising a polymer blend of polyimide and amino silicone having carbon black dispersed therein.

10. The intermediate transfer member of claim 9 wherein the amino silicone represented by structures selected from the group consisting of:

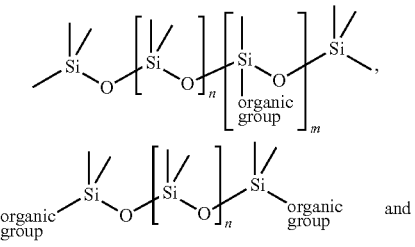

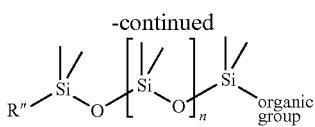

wherein the organic group is one of —RNH$_2$ or —RNHR'NH$_2$; R, R' and R" each represent an alkyl having from 1 to 8 carbon atoms; n is an integer from 1 to 100 and m is an integer from 1 to 100.

11. The intermediate transfer member of claim 9 wherein the carbon black comprises from about 0.1 to about 50 weight percent of the layer.

12. The intermediate transfer member of claim 9 wherein the amino silicone comprises from about 0.01 to about 5.0 weight percent of the polymer blend.

13. The intermediate transfer member of claim 9 wherein the polyimide comprises from about 99.9 weight percent to about 95.0 weight percent of the polymer blend.

14. The intermediate transfer member of claim 9 wherein the layer comprises a water contact angle of from about 80° to about 140°.

15. The intermediate transfer member of claim 9 wherein the layer comprises modulus of from about 3000 MPa to about 8000 MPa.

16. The intermediate transfer member of claim 9 comprising a thickness of from about 30 microns to about 400 microns.

17. An intermediate transfer member comprising:
a layer comprising a polymer blend of polyimide and amino silicone having conductive particles dispersed therein.

18. The intermediate transfer member of claim 17 wherein conductive component is selected from the group consisting of carbon blacks, carbon nanotubes, grapheme, metal oxides, doped metal oxides, polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts, and mixtures thereof.

19. The intermediate transfer member of claim 17 wherein the layer comprises a water contact angle of from about 80° to about 140°.

20. The intermediate transfer member of claim 17 comprising a thickness of from about 30 micron to about 400 microns.

* * * * *